(12) United States Patent
Lee

(10) Patent No.: US 9,700,970 B2
(45) Date of Patent: Jul. 11, 2017

(54) FASTENING DEVICE AND CONTROL METHOD OF THE SAME

(71) Applicant: Hyundai Motor Company, Seoul (KR)

(72) Inventor: Jaehyun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 845 days.

(21) Appl. No.: 14/089,379

(22) Filed: Nov. 25, 2013

(65) Prior Publication Data

US 2014/0216772 A1 Aug. 7, 2014

(30) Foreign Application Priority Data

Feb. 4, 2013 (KR) .......................... 10-2013-0012543

(51) Int. Cl.
| | | |
|---|---|---|
| *B25B 23/14* | (2006.01) | |
| *B23P 19/04* | (2006.01) | |
| *B23P 19/06* | (2006.01) | |

(52) U.S. Cl.
CPC ............. *B23P 19/04* (2013.01); *B23P 19/066* (2013.01); *B25B 23/14* (2013.01)

(58) Field of Classification Search
CPC ......... B23P 19/04; B23P 19/066; B25B 23/14
USPC ......................................... 73/862.21, 862.24
See application file for complete search history.

(56) References Cited

U.S. PATENT DOCUMENTS

| | | | | |
|---|---|---|---|---|
| 5,476,014 A | * | 12/1995 | Lampe ................. | B25B 23/14 |
| | | | | 73/862.21 |
| 2003/0218537 A1 | * | 11/2003 | Hoch ..................... | G06F 3/011 |
| | | | | 340/524 |
| 2007/0144270 A1 | * | 6/2007 | Crass .................. | B25B 23/1425 |
| | | | | 73/862.21 |
| 2009/0114411 A1 | * | 5/2009 | Paprocki ............. | B25B 23/1405 |
| | | | | 173/176 |
| 2011/0079406 A1 | * | 4/2011 | Elsmark ................ | B25B 21/00 |
| | | | | 173/1 |

FOREIGN PATENT DOCUMENTS

| | | |
|---|---|---|
| CN | 2094430 U | 1/1992 |
| CN | 101251364 A | 8/2008 |
| CN | 102015219 A | 4/2011 |
| CN | 201833325 U | 5/2011 |
| JP | 2007-307663 A | 11/2007 |
| KR | 1996-0003720 Y1 | 5/1996 |

* cited by examiner

*Primary Examiner* — Max Noori
(74) *Attorney, Agent, or Firm* — Morgan Lewis & Bockius LLP

(57) ABSTRACT

A fastening device may include a fastening tool body having a fastener on one end; a drive unit installed on the fastening tool body and providing fastening power to the fastener; a gyroscopic sensor that is installed on the fastening tool body and detects the displacement of the fastening tool body and outputs a detection signal thereof; an angle sensor that detects the angle of the fastening tool body and outputs a detection signal thereof to a controller; and the controller that receives the signals output from the gyroscopic sensor and the angle sensor and output a set actuating signal to the drive unit.

3 Claims, 4 Drawing Sheets

FASTENING DEVICE AND CONTROL METHOD OF THE SAME

CROSS-REFERENCE TO RELATED APPLICATION

The present application claims priority to Korean Patent Application No. 10-2013-0012543 filed on Feb. 4, 2013, the entire contents of which is incorporated herein for all purposes by this reference.

BACKGROUND OF THE INVENTION

Field of the Invention

The present invention relates to a car body assembly system, and more particularly, to a fastening device for fastening various parts to a car body in a finished car production process and a control method of the same.

Description of Related Art

In general, car markers assemble tens of thousands of parts by many welding and assembly processes in every mass production process until a single car is produced.

That is, a car production process includes assembling various parts. In the process of assembling parts, large quantities of connecting members such as bolts, nuts, etc for connecting parts and a car body are fastened.

For example, assuming that four fastening points are present in a single process of assembling/fastening parts to a car body and each fastening point requires a fastening torque of A kgf or B kgf, at least two fastening tools and a controller are required in the conventional art even though this operation is executed in the same process.

Here, each fastening tool is set by the controller to perform an operation with the fastening torque of A kgf or B kgf, and a worker has to select a tool appropriate for the fastening torque at a fastening point.

However, because parts are conventionally fastened to a car body with the use of a plurality of fastening tools in a part fastening process, various fastening tools may cause an increase in investment costs.

Moreover, fastening operations at a plurality of fastening points with different fastening torques are done by replacing the plurality of fastening tools with each other, thereby the efficiency of the fastening operations may be reduced and the cycle time may be increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a fastening device, which is capable of performing a plurality of fastening operations requiring different fastening torques with the use of a single fastening tool, and a control method thereof.

In an aspect of the present invention, a fastening device which fastens a predetermined part to a plurality of fastening points of a fastening object by a connecting member may include a fastening tool body having a fastener on one end thereof, a drive unit installed on the fastening tool body and providing fastening power to the fastener, a gyroscopic sensor that is installed on the fastening tool body and detects a displacement of the fastening tool body and outputs a detection signal thereof, an angle sensor that detects an angle of the fastening tool body and outputs a detection signal thereof to a controller, and the controller that receives the signals output from the gyroscopic sensor and the angle sensor and output a set actuating signal to the drive unit.

The drive unit is installed within the fastening tool body.

The drive unit may include a motor that generates torque according to an electric signal from the controller, and a power transmitter that is engaged to the motor and the fastener and transmits the torque of the motor to the fastener.

The gyroscopic sensor and the angle sensor are mounted on a side of the fastener of the fastening tool body through a mounting bracket.

The fastener is configured on a first end of the fastening tool body, and a power connector is installed on a second end of the fastening tool body, the power connector connected to the drive unit to apply a power to the drive unit.

A handle portion is installed on an outer surface of the fastening tool body.

In another aspect of the present invention, a control method of a fastening device for fastening a predetermined part to a plurality of fastening points of a fastening object, may include (a) making a measurement of a displacement of a fastening tool body by a gyroscopic sensor, (b) determining by a controller whether the measurement of the displacement of the fastening tool body is a set value, (c) when the measurement of the displacement is the set value, making a measurement of an angle of the fastening tool body secured to a fastening point by an angle sensor, and (d) applying a fastening torque corresponding to the fastening point to a drive unit in accordance with the controller, depending on the measurement of the angle of the fastening tool body.

In step (b), the set value is 0.

In step (d), the controller identifies a type of the fastening point by comparing the measurement of the angle made by the angle sensor with a preset reference value, and outputs a corresponding signal.

After step (d), the steps (a), (b) and (c) are repeatedly carried out on the other fastening points.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
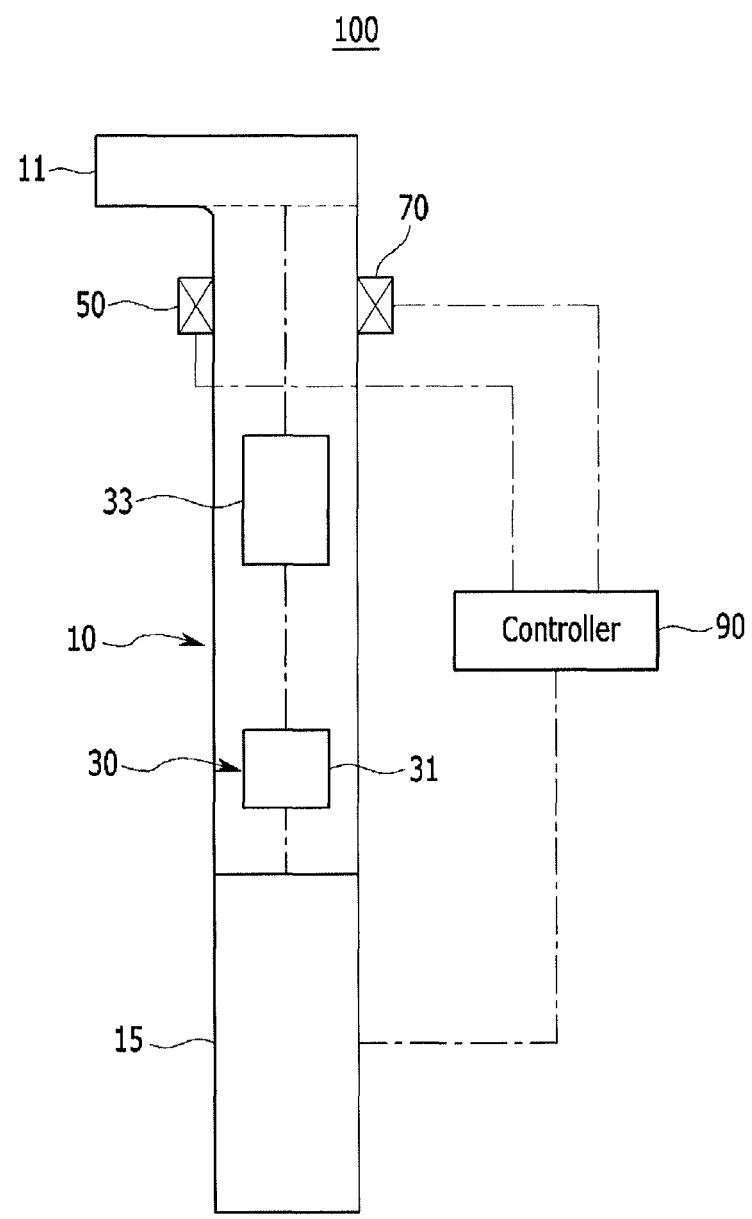
FIG. 1 is a block diagram schematically showing a fastening device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clarify the present invention, parts that are not connected with the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of portions, regions, etc are exaggerated for clarity.

Moreover, the use of the terms first, second, etc. do not denote any order or importance, but rather the terms first, second, etc. are used to distinguish one element from another.

Throughout the specification, unless explicitly described to the contrary, the word "comprise" and variations such as "comprises" or "comprising", will be understood to imply the inclusion of stated elements but not the exclusion of any other elements.

Terms 'unit', 'means', '-er (-or)', 'member', etc, described in the specification indicate a unit for performing at least one function or operation.

FIG. 1 is a block diagram schematically showing a fastening device according to an exemplary embodiment of the present invention.

Referring to FIG. 1, the fastening device 100 according to the exemplary embodiment of the present invention is applicable to a car body assembly system in a car production process for fastening/assembling predetermined parts to a car body.

For example, the exemplary embodiment of the present invention can be applied to the fastening and assembling of parts such as a brake pedal to a car body by connecting members including bolts and nuts in a finished car production process.

Here, the fastening device 100 according to the exemplary embodiment of the present invention is an electric fastening tool that electrically tightens connecting members such as bolts, nuts, etc, by which the connecting members are fastened to a plurality of fastening points by different fastening forces to assemble parts to a car body.

Figure 2:
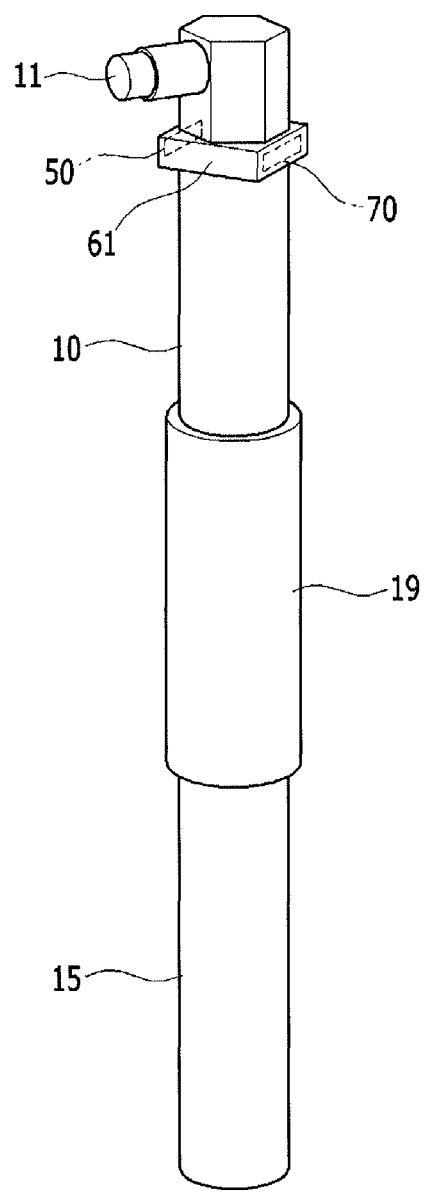
FIG. 2 is a view showing the configuration of a fastening device according to the exemplary embodiment of the present invention.

FIG. 2 is a view showing the configuration of a fastening device according to the exemplary embodiment of the present invention.

Referring to FIGS. 1 and 2, the fastening device 100 according to the exemplary embodiment of the present invention basically includes a fastening tool body 10, a drive unit 30, a gyroscopic sensor 50, and an angle sensor 70, each of which will be described below.

In the exemplary embodiment of the present invention, the fastening tool body 10 constitutes the main body of an electric fastening tool, and is used to mount a variety of components to be described hereinbelow.

The fastening tool body 10 may be equipped with elements such as various types of brackets, support blocks, etc for supporting the above-mentioned components.

Since the above-mentioned elements are for supporting various types of components, they will be referred to collectively as the fastening tool body 10, with the exception of some cases, in the exemplary embodiment of the present invention.

The drive unit 30, which will be further explained later, can be configured within the fastening tool body 10.

Here, a fastener 11 is provided on one end (top in the drawing) of the fastening tool body 10 to fasten a connecting member such as a bolt and/or nut to a predetermined fastening member.

The fastener 11 is rotatable by the drive unit 30 to be further explained later.

Also, a power connector 15 for applying power to the drive unit 30 is installed on the other end (bottom in the drawing) of the fastening tool body 10.

Moreover, a handle portion 19 for a worker to hold is installed roughly in the middle of the fastening tool body 10. The handle portion 19 may be made of a rubber material or plastic material.

In the exemplary embodiment of the present invention, the drive unit 30 is used to provide fastening force (torque) to the aforementioned fastener 11, and may be electrically connected to the power connector 15, mechanically connected to the fastener 11, and installed within the fastening tool body 10.

The drive unit 30 includes a motor 31 that generates torque by an electric signal, and a power transmitter 33 that transmits the torque of the motor 31 to the fastener 11.

Examples of the power transmitter 33 may include a bevel drive gear and a bevel pinion gear which connect the motor 31 and the fastener 11. Besides, the examples may include a variety of gears that transmit the torque of the motor 31 to a predetermined rotating body.

Since this power transmitter 33 includes a power transmission unit, which is well known to those skilled in the art, more detailed description of this component will be omitted in this specification.

In the exemplary embodiment of the present invention, the gyroscopic sensor 50 detects the displacement of the fastening tool body 10, outputs its detection signal to the controller 90, and is installed on the fastening tool body 10.

The gyroscopic sensor 50 (commonly referred to by those skilled in the art as 'gytrosensor') is installed on the side of the fastener 11 of the fastening tool body 10 through a mounting bracket 61, and usually measures the rotational angular velocity of an object. The gyroscopic sensor 50 is applicable to an anti-hand shake device of a camcorder, a 3D mouse, a stability controller of an RC helicopter, and so on.

Here, the gyroscopic sensor 50 shows a measured value of '0' when the fastening tool body 10 does not move and stands still.

Also, in the exemplary embodiment of the present invention, the angle sensor 70 detects the angle (inclination) of the fastening tool body 10 secured (placed) at a certain fastening point, outputs its detection signal to the controller 90, and is installed on the fastening tool body 10.

The angle sensor 70 is installed on the side of the fastener 11 of the fastening tool body 10 through the aforementioned mounting bracket 61, and may be an optical lever angle sensor, a polarization angle sensor, etc that measures the inclination of a predetermined object.

Here, the controller 90 can identify the type of a fastening point to which a connecting member is fastened (the angle at which the connecting member is fastened) by comparing a measurement of the angle of the fastening tool body 10 made by the angle sensor 70 with a preset reference value.

The gyroscopic sensor 50 and angle sensor 70 as above are well known to those skilled in the art, so more detailed description of these components will be omitted in this specification.

Hereinafter, the operation and control method of the thus-configured fastening device 100 according to the exemplary embodiment of the present invention will be described in detail with reference to the disclosed drawings and the accompanying drawings.

Figure 3:
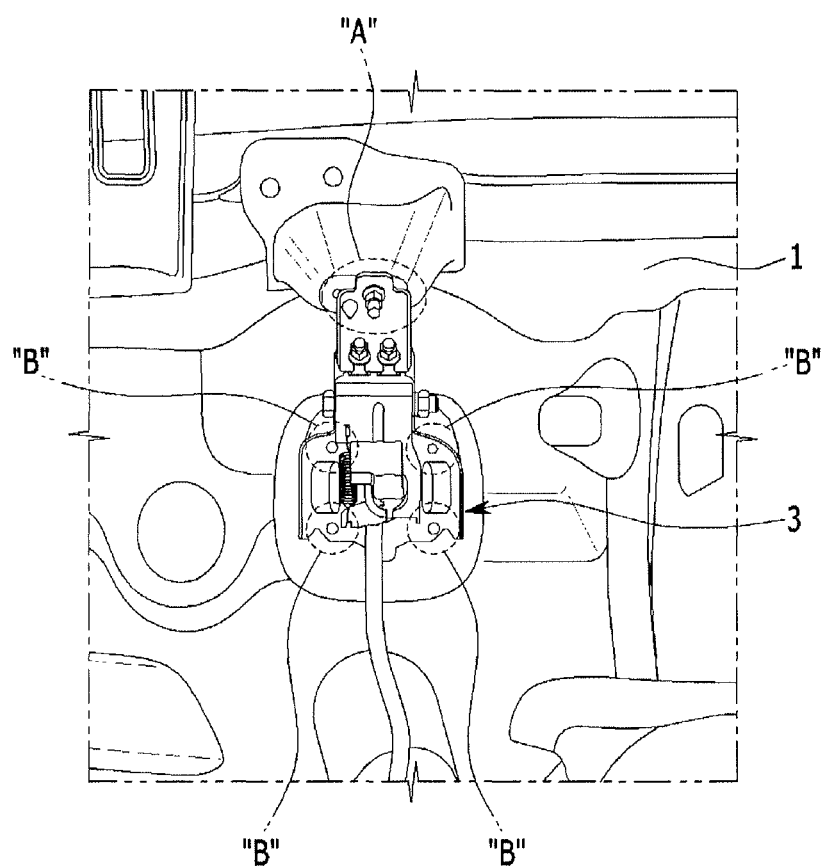
FIG. 3 is a view showing a fastening object to explain a control method of a fastening device according to the exemplary embodiment of the present invention.

FIG. 3 is a view showing a fastening object to explain a control method of a fastening device according to the exemplary embodiment of the present invention.

Referring to FIG. 3, the exemplary embodiment of the present invention will be described with an example where a part 3 such as a brake pedal, as a fastening object, is fastened/assembled to a car body 1 by a connecting member such as a bolt or nut.

Here, a plurality of fastening points (five points indicated as 'A' or 'B' in the drawing), which require different fastening angles and different fastening torques), are present in the region where the car body 1 and the part 3 are fastened together.

For example, in the fastening region of the car body 1 and the part 3, the fastening points A must satisfy a fastening angle of 23 degrees and a fastening torque of a kgf, and the fastening points B must satisfy a fastening angle of 90 degrees and a fastening torque of b kgf.

As used herein, the fastening angle denotes an inclination at a predetermined fastening point relative to the ground.

Figure 4:
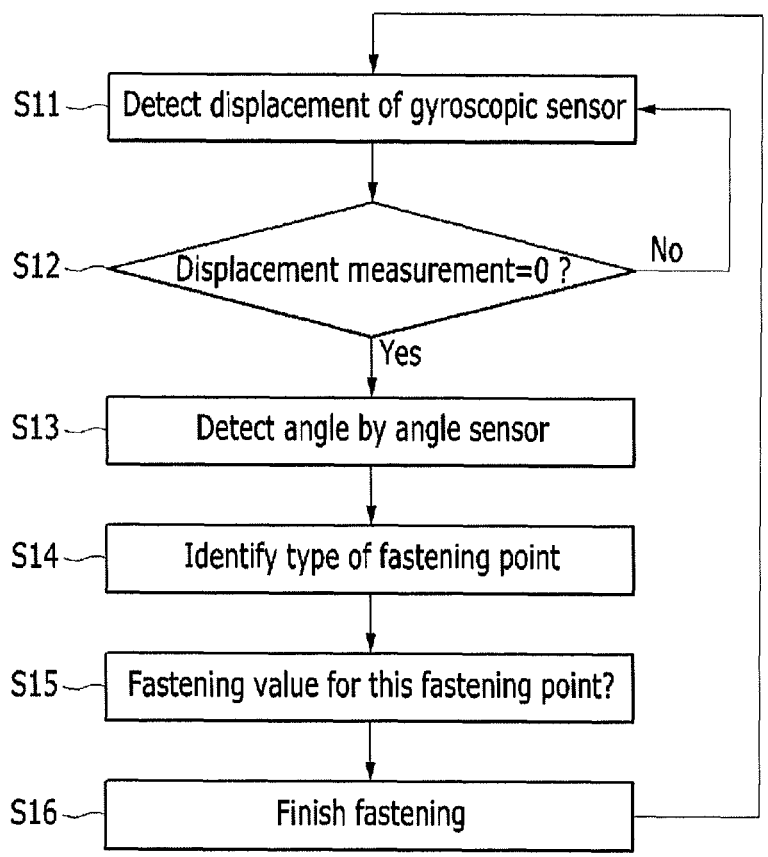
FIG. 4 is a flowchart for explaining a control method of a fastening device according to the exemplary embodiment of the present invention.

FIG. 4 is a flowchart for explaining a control method of a fastening device according to the exemplary embodiment of the present invention.

Referring to FIGS. 3 and 4, in the exemplary embodiment of the present invention, the worker first has to place (secure) the fastener 11 of the fastening tool body 10 to a certain fastening point (A or B in the drawing), in order to fasten the car body 1 and the part 3.

In this case, the gyroscopic sensor 50 detects the displacement of the fastening tool body 10 and outputs its detection signal to the controller 90 (S11).

Then, the controller 90 determines whether a measurement of the displacement of the gyroscopic sensor 50 is constant (displacement measurement=0) (S12).

In S12, if the measurement of the displacement of the gyroscopic sensor 50 is determined as 0, the angle (relative inclination) of the fastening tool body 10 secured to the fastening point is detected by the angle sensor 70, and its detection signal is output to the controller 90 (S13).

Hereupon, the controller 90 identifies the type of a fastening point (A or B in the drawing) by comparing a measurement of the angle of the fastening tool body 10 made by the angle sensor 70 with a preset reference value. (S14).

When the type of the fastening point is identified by the angle sensor 70, the controller 90 applies an electric signal to the drive unit 30 and provides a fastening torque corresponding to the fastening point to the fastener 11 of the fastening tool body 10 (S15).

Here, the drive unit 30 can transmit torque produced from the motor 31 to the fastener 11 through the power transmitter 33.

Accordingly, the car body 1 and the part 3 can be fastened together by a connecting member such as a bolt and nut, by providing a fastening torque corresponding to a certain fastening point to the fastener 11 of the fastening tool body 100 placed at the fastening point (S16).

Taking S15 as an example, if the measurement of the angle of the fastening tool body 10 made by the angle sensor 70 is 23 degrees, the fastening point is determined as A, and the fastening torque of a kgf is provided to the fastener 11 of the fastening tool body 10.

On the other hand, if the measurement of the angle of the fastening tool body 10 made by the angle sensor 70 is 90 degrees, the fastening point is determined as B, and the fastening torque of b kgf is provided to the fastener 11 of the fastening tool body 10.

By doing so, in the exemplary embodiment of the present invention, a series of processes as described above are repeatedly carried out, and a predetermined part 3 can be fastened to the car body 1 by providing the fastening torques corresponding to the fastening points A and B to the fastener 11 of the fastening tool body 10.

According to the fastening device and control method of the same according to the exemplary embodiment of the present invention as thus far described, a plurality of fastening points, which require different fastening torques in the same fastening process, can be dealt with by a single fastening tool, with the use of the gyroscopic sensor 50 and the angle sensor 70.

Accordingly, the exemplary embodiment of the present invention can contribute to reduction of redundant investment costs, unlike the conventional art, because a connecting member such as a bolt and nut can be fastened via a single fastening tool to a plurality of fastening points that require different fastening torques.

Furthermore, the exemplary embodiment of the present invention can increase worker convenience and cut down on cycle time because there is no need to replace a fastening tool for a plurality of fastening points that require different fastening torques.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A control method of a fastening device for fastening a predetermined part to a plurality of fastening points of a fastening object, the control method comprising:
    (a) making a measurement of a displacement of a fastening tool body by a gyroscopic sensor;
    (b) determining by a controller whether the measurement of the displacement of the fastening tool body is a set value;
    (c) when the measurement of the displacement is the set value, making a measurement of an angle of the fastening tool body secured to a fastening point by an angle sensor; and
    (d) applying a fastening torque corresponding to the fastening point to a drive unit in accordance with the controller, depending on the measurement of the angle of the fastening tool body,
    wherein, in step (d), the controller identifies a type of the fastening point by comparing the measurement of the angle made by the angle sensor with a preset reference value, and outputs a corresponding signal.

2. The method of claim 1, wherein, in step (b), the set value is 0.

3. The method of claim 1, wherein, after step (d), the steps (a), (b) and (c) are repeatedly carried out on the other fastening points.

* * * * *